United States Patent
Hoseney et al.

(10) Patent No.: US 6,482,454 B2
(45) Date of Patent: Nov. 19, 2002

(54) MICROWAVEABLE BREAD PRODUCTS

(75) Inventors: R. Carl Hoseney; Rebecca Ann Miller, both of Manhattan; Sukh Bassi, Atchison, all of KS (US); Clodualdo C. Maningat, Platte City, MO (US)

(73) Assignee: Midwest Grain Products, Inc., Atchison, KS (US)

( * ) Notice: Subject to any disclaimer, the term of this patent is extended or adjusted under 35 U.S.C. 154(b) by 22 days.

(21) Appl. No.: 09/782,698

(22) Filed: Feb. 13, 2001

(65) Prior Publication Data

US 2002/0110629 A1 Aug. 15, 2002

(51) Int. Cl.$^7$ .............................. A21D 2/00; A21D 8/00
(52) U.S. Cl. ....................... 426/242; 426/496; 426/549; 426/622; 219/725
(58) Field of Search .................... 426/242, 496, 426/549, 622; 219/725

(56) References Cited

U.S. PATENT DOCUMENTS 4,560,559 A * 12/1985 Ottenberg .................... 426/19
5,049,398 A * 9/1991 Saari et al. .................. 426/20
5,447,738 A * 9/1995 de Bruijne et al. ......... 426/549
5,515,718 A * 5/1996 Miller et al. .................... 73/81
6,080,436 A * 6/2000 Lenahan ...................... 426/242
6,207,813 B1 * 8/2001 Nielsen et al. ................ 426/20

FOREIGN PATENT DOCUMENTS

DE          2434261     *  1/1967
WO      WO 91/07861    *  5/1991

OTHER PUBLICATIONS

Miller et al.; Method to Measure Microwave–Induced Toughness of Bread; J. Food Science; 62(6); 1202–1204 (1997).

* cited by examiner

Primary Examiner—Nina Bhat
(74) Attorney, Agent, or Firm—Hovey Williams LLP

(57) ABSTRACT

Bread and similar wheat flour-based products are provided which exhibit reduced toughness when subjected to microwave heating. The products are prepared from wheat flour-based, leavened doughs which have adjusted gliadin:glutenin ratios of from about 1.1–2.3, such ratio adjustment is preferably accomplished by the addition of a gliadin-rich preparation into the starting doughs, typically at levels of from about 1–6% (fwb).

15 Claims, 2 Drawing Sheets

Microwave-induced toughness of pup loaf bread

MICROWAVEABLE BREAD PRODUCTS

BACKGROUND OF THE INVENTION

1. Field of the Invention

The present invention is broadly concerned with improved wheat flour-based leavened foods (e.g., breads of various types) which exhibit reduced toughness when subjected to microwave heating. More particularly, the invention is concerned with such products, as well as their precursor doughs, wherein the gliadin:glutenin ratios of the doughs are adjusted to a level of from about 1.1–2.3. Preferably, such ratio adjustment is accomplished by the addition of minor amounts of a gliadin-rich preparation into the doughs.

2. Description of the Prior Art

Wheat flour contains variable amounts of protein with 10% being normal for bakery flour. Of this 10% protein, about 85% is gluten protein with the remainder being water and salt soluble proteins. Thus, in 100 g of bakery flour there are about 8.5 g of gluten protein, which contains about 48% gliadin and 52% glutenin, or 4.08 g gliadin and 4.42 g glutenin. Hence, the gliadin:glutenin ratio for such flour is about 0.92.

It is well known that stale bread products can be refreshed by heating. However, bread reheated in a microwave oven often becomes tougher (i.e., rubbery and difficult to masticate). Although the mechanism of bread toughening is not clearly understood, formula modifications have been shown to reduce microwave-induced toughness of reheated bread. These include the addition of certain emulsifiers, a combination of emulsifiers and pregelatinized starch, and a combination of high levels of shortening and added fiber.

Notwithstanding these prior efforts, the problem of microwave-induced toughening of breads and similar products remains largely unresolved. As can be appreciated, this problem is particularly acute with many convenience foods such as sandwiches or bread-based pizza products. In such cases, consumers often prefer to microwave heat the products to save time and eliminate the need of conventional oven heating. However, bread products in the prior art often become unacceptably chewy and tough as a result of microwave heating. As a consequence, the desirability and hence saleability of these snack food items is reduced.

There is accordingly a real and unresolved need in the art for improved bread and similar products having reduced microwave heating-induced toughness. At the same, any method to accomplish these ends must be relatively simple and inexpensive.

SUMMARY OF THE INVENTION

The present invention overcomes the problems outlined above, and provides an easy method for reducing microwave heating-induced toughness of wheat flour-based leavened foods made from starting ingredients containing wheat flour. Such doughs inherently have respective amounts of gliadin and glutenin therein, as a portion of the gluten fraction of the wheat flour. In the invention, the gliadin:glutenin ratio of the starting dough is adjusted to a level of from about 1.1–1.3, and more preferably from about 1.3–1.6.

In preferred forms, the ratio adjusting step involves the addition of a minor amount of a gliadin-rich preparation to the starting dough. As used herein "gliadin-rich preparation" refers to a fraction or preparation containing an amount of gliadin substantially above that of normal wheat flour. Usually, such a gliadin-rich preparation would contain at least about 50% by weight gliadin, and more preferably at least about 65% by weight. It will be understood in this respect that commercially available gliadin-rich preparations contain additional proteins such as glutenin as well as other ingredients, but these preparations do contain a substantial gliadin fraction. When such a commercial gliadin-rich preparation is added to a starting dough, it should be present in an amount of from about 1–6% (fwb), and more preferably from about 2–3% (fwb).

It will be understood that the principles of the invention have relatively broad applicability in terms of products. For example, conventional breads of various sizes and shapes can be improved in accordance with the invention, but also items such as sweet rolls and biscuits are also suitable. Normally, the products of the invention are yeast-leavened; however, the invention is not so limited, and improvement can be made with chemically leavened products as well. Generally, the products of the invention are baked, but fried, steamed or otherwise cooked products can also be improved via the invention.

DETAILED DESCRIPTION OF THE PREFERRED EMBODIMENTS

Figure 1:
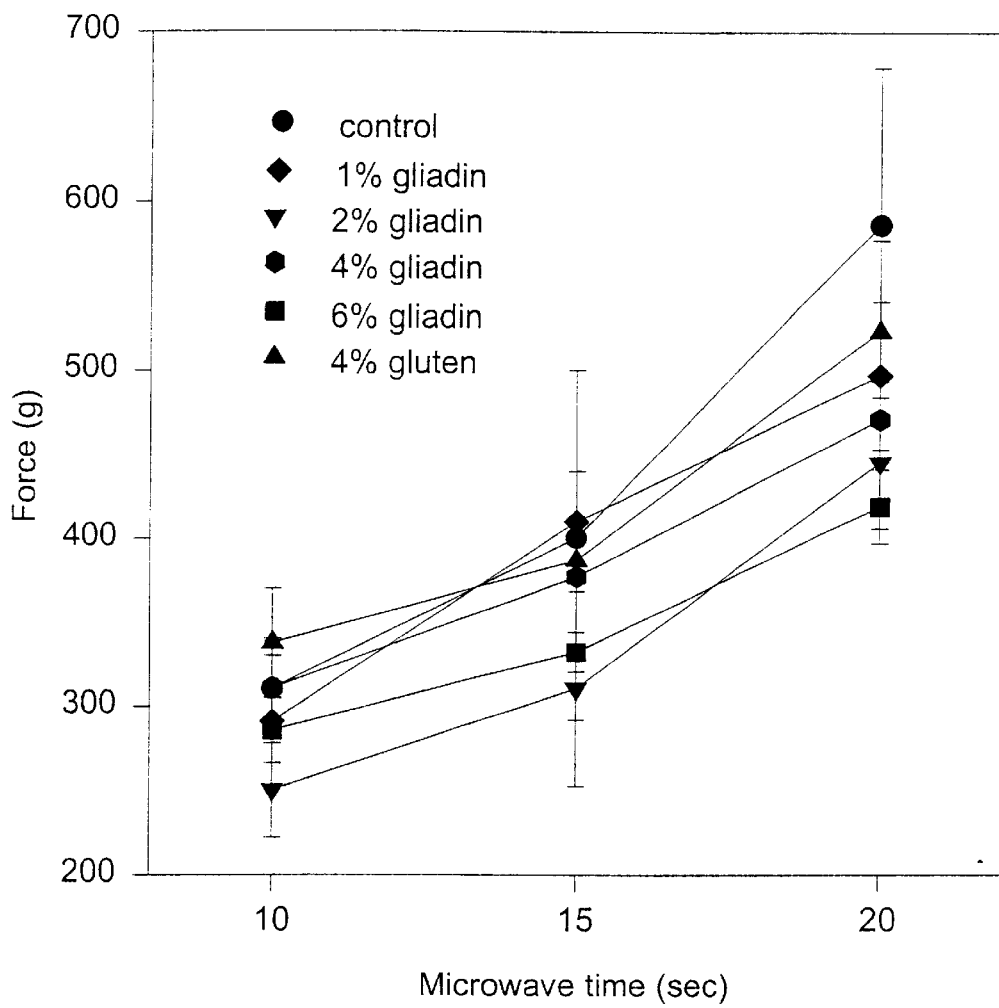
FIG. 1 is a graph illustrating the microwave-induced toughness of pup loaf breads containing added gliadin, in accordance with the invention.

The following examples set forth presently preferred formulations and techniques in accordance with the invention. It is to be understood, however, that these examples are provided by way of illustration only, and nothing therein should be taken as a limitation upon the overall scope of the invention.

EXAMPLES

In these tests pup loaves and hoagie buns were prepared and conventionally baked from dough with and without added gliadin-rich preparation in order to adjust the gliadin:glutenin ratios of the doughs, and the resultant baked products were microwave-heated and tested for toughness.

Pup Loaf Bread Preparation and Toughness Testing

Bread was baked as pup loaves using AACC Method 10-10B straight dough procedure with 90 minute fermentation (American Association of Cereal Chemists, 1983. Approved methods of the AACC, 8th ed. Method 10-10B, approved January, 1983, revised September, 1985.). The bread formula consisted of flour (100 g, 14% mb), nonfat dry milk (4 g), shortening (3 g), instant active dry yeast (2 g), sugar (6 g), and salt (1.5 g). Water absorption was 64% for the control buns. The water level was increased 1% for each 1% added gliadin or gluten. Gliadin was added at 1, 2, 4, and 6% (fwb). As controls, buns containing 4% (fwb) vital wheat gluten and buns containing no added gliadin or gluten were also tested.

After cooling, the loaves were packaged and held at room temperature overnight. Three 1" thick slices were taken from each bun. Each slice was placed on an inverted Styrofoam cup and heated on high power in the microwave oven for 10, 15, or 20 sec. The Styrofoam cup prevented condensation under the slice and gave more uniform microwave heating. The slices were allowed to cool to room temperature then a 1" wide slice cut from the center of the bread slice was tested for toughness using the TA.XT2 Texture Analyzer (SMS Micro Systems/Texture Technologies) and the Miller/Hoseney Toughness Rig described in U.S. Pat. No. 5,518,718 and Miller et al., Method of Measuring Microwave-Induced Toughness of Bread, *J. Food. Sci.*, 62:1202–04 (1997). Three loaves of each treatment were tested.

Hoagie Bun Preparation and Toughness Testing

Hoagie-style buns were prepared using the AACC straight dough formula for pup loaves given above. Water absorption was 64% for the control buns. The water level was increased 1% for each 1% added gliadin. Water absorption of buns containing gluten was 71%. Gliadin was added at 1, 2, 4, and 6% (fwb) to achieve gliadin:glutenin ratios of about 1.15, 1.38, 1.83, and 2.28, respectively. As controls, buns containing 4% (fwb) vital wheat gluten and buns containing no added gliadin or gluten were also tested. All doughs were mixed to optimum development. After mixing, the doughs were rested for 15 min then molded, stretched to a length of approximately 6", and placed on baguette baking screens to proof then baked at 400° C. for 20 min. Doughs containing gliadin and control doughs (0% gliadin) were proofed for 30 min and doughs containing gluten were proofed for 15 min. The shorter proof time and higher absorption of gluten containing doughs was necessary to produce buns of approximately the same size as doughs containing gliadin and the control.

After cooling, the buns were packaged and held at room temperature overnight. A 1" thick horizontal slice was taken from each bun. Each slice was placed on an inverted Styrofoam cup and heated on high power in the microwave oven for 15, 20, or 25 sec. The Styrofoam cup prevented condensation under the slice. The slices were allowed to cool to room temperature then a 1" wide slice cut from the center of the bread slice was tested for toughness using the TA.XT2 Texture Analyzer (SMS Micro Systems/Texture Technologies) and the above-referred Miller/Hoseney Toughness Rig. At least three buns of each treatment were tested.

Dough Characteristics

Doughs containing added gliadin were slightly more extensible than control dough and doughs containing added vital wheat gluten. The control doughs and doughs containing vital wheat gluten were slightly bucky. Mixing time decreased as gliadin level was increased.

Hoagie buns were prepared with no fermentation. When the buns were fully fermented (90 min) they became too strong (elastic) and the final buns were a round shape rather than the desirable long, thin shape. It was necessary to decrease the proof time and increase the water absorption of the doughs containing gluten in order to get the same dough flow properties with a similar size and shape.

Microwave-Induced Toughness

Toughness increased as microwave heating time increased. Twenty seconds was the longest heating time possible with pup loaf slices. Slices heated longer than 20 seconds became dry and hard around the edges. In general, the addition of gliadin at all levels decreased the microwave-induced toughness of pup loaf bread at each heating time (FIG. 1). The addition of 2 and 6% gliadin (fwb) was the most effective (least toughness).

Figure 2:
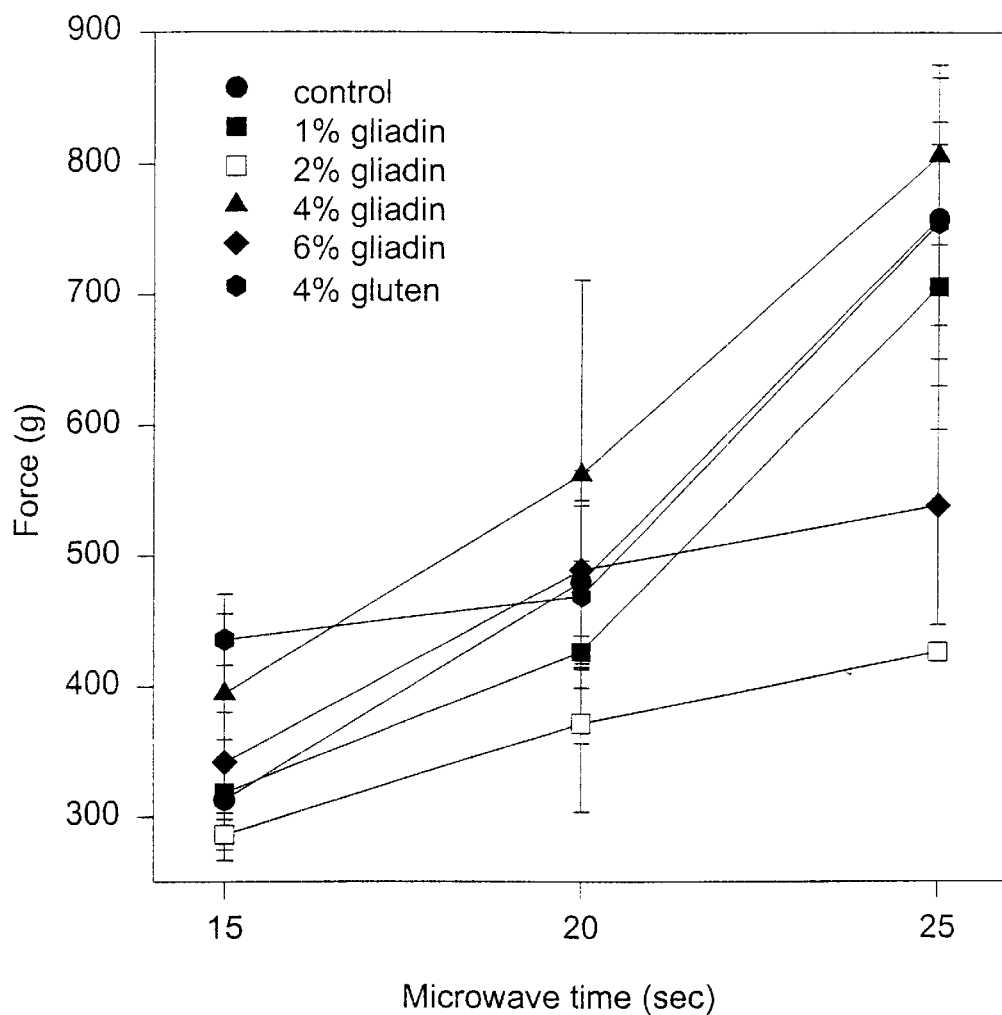
FIG. 2 is a graph illustrating the microwave-induced toughness of hoagie buns having added amounts of gliadin.

Slices from hoagie buns could be heated longer (up to 25 sec) before the slice became dry and hard. Presumably this is because of the different dimensions of the slices. Hoagie bun slices weighed approximately 35 g and pup loaf slices weighed approximately 45 g. Hoagie buns containing gluten became tougher than control buns with short heating time (15 sec) but were the same toughness with longer heating times (FIG. 2). As in pup loaf bread, the addition of 2 and 6% gliadin was the most effective at decreasing microwave-induced toughness. At 6%, a grain-like odor was observed during heating and an off flavor was present in the bread. Although buns containing 4% gliadin were less tough than the control when reheated, they were still much tougher than the buns containing 2% gliadin.

CONCLUSION

The addition of a gliadin-rich preparation decreases the microwave-induced toughness of bread. In the formula tested, the optimum level was 2%. The addition of 6% gliadin was also effective; however a grain-like odor was observed during microwave heating and the flavor of the bread was altered.

All patents and literature references referred to above are fully incorporated by reference herein.

We claim:

1. A method of reducing the microwave heating-induced toughness of wheat flour-based leavened foods made from a starting dough containing wheat flour and having respective amounts of gliadin and glutenin therein, comprising the step of adjusting the gliadin:glutenin ratio of said starting dough to a level of from about 1.1–2.3.

2. The method of claim 1, said ratio being from about 1.3–1.6.

3. The method of claim 1, said adjusting step comprising the step of adding an amount of a gliadin-rich preparation to said starting dough.

4. The method of claim 3, said added gliadin amount being from about 1–6% (fwb).

5. The method of claim 4, said added gliadin amount being from about 2–3% (fwb).

6. A method of reducing the microwave heating-induced toughness of wheat flour-based leavened foods made from a starting dough containing wheat flour and having respective amounts of gliadin and glutenin therein, comprising the step of adjusting the gliadin:glutenin ratio of said starting dough to a level of from about 1.1–1.3 by the addition of from about 1–6% (fwb) a gliadin-rich preparation to said starting dough.

7. The method of claim 6, said added gliadin amount being from about 2–3% (fwb).

8. A wheat flour-based leavened dough comprising an amount of wheat flour, water, and a leavening agent, said dough having a gliadin:glutenin ratio of from about 1.1–2.3.

9. The dough of claim 8, said ratio being from about 1.3–1.6.

10. A food product made using the dough of claim 8.

11. A hoagie bun made using the dough of claim 8.

12. A wheat flour-based leavened dough comprising an amount of wheat flour, water, a leavening agent, and from about 1–6% (fwb) of additional a gliadin-rich preparation.

13. The dough of claim 12, said additional gliadin-rich preparation being present at a level of from about 2–3% (fwb).

14. A food product made using the dough of claim 11.

15. A hoagie bun made using the dough of claim 12.

* * * * *